(12) United States Patent
Dechovich et al.

(10) Patent No.: US 9,104,574 B2
(45) Date of Patent: Aug. 11, 2015

(54) SYSTEM AND METHOD FOR SOFTWARE APPLICATION REMEDIATION

(75) Inventors: Zak Dechovich, Kfar-Saba (IL); Yossi Koren, Jerusalem (IL)

(73) Assignee: REIMAGE LIMITED, Tortola (VG)

( * ) Notice: Subject to any disclaimer, the term of this patent is extended or adjusted under 35 U.S.C. 154(b) by 1229 days.

(21) Appl. No.: 12/303,375

(22) PCT Filed: Jun. 4, 2007

(86) PCT No.: PCT/IL2007/000677
§ 371 (c)(1),
(2), (4) Date: Aug. 27, 2009

(87) PCT Pub. No.: WO2007/141780
PCT Pub. Date: Dec. 13, 2007

(65) Prior Publication Data
US 2010/0064285 A1 Mar. 11, 2010

Related U.S. Application Data

(60) Provisional application No. 60/810,704, filed on Jun. 5, 2006.

(51) Int. Cl.
*G06F 9/44* (2006.01)
*G06F 11/07* (2006.01)

(52) U.S. Cl.
CPC ........ *G06F 11/0793* (2013.01); *G06F 11/0748* (2013.01)

(58) Field of Classification Search
None
See application file for complete search history.

(56) References Cited

U.S. PATENT DOCUMENTS

| 6,397,381 | B1 * | 5/2002 | Delo et al. | 714/15 |
| 6,425,125 | B1 * | 7/2002 | Fries et al. | 717/170 |
| 6,718,549 | B1 * | 4/2004 | Narin et al. | 717/170 |
| 6,751,795 | B1 * | 6/2004 | Nakamura | 717/174 |
| 6,789,215 | B1 * | 9/2004 | Rupp et al. | 714/38.14 |
| 6,918,056 | B2 * | 7/2005 | Paek | 714/27 |
| 7,367,027 | B1 * | 4/2008 | Chen et al. | 717/170 |
| 7,389,442 | B1 * | 6/2008 | Lee | 714/2 |
| 7,546,492 | B2 * | 6/2009 | McCuller | 714/52 |
| 7,702,952 | B2 * | 4/2010 | Tarra et al. | 714/6.11 |
| 7,908,271 | B2 * | 3/2011 | Hooks | 707/728 |
| 8,127,412 | B2 * | 3/2012 | Gleichauf et al. | 26/22 |

(Continued)

*Primary Examiner* — Don Wong
*Assistant Examiner* — Erika Kretzmer
(74) *Attorney, Agent, or Firm* — Vladimir Sherman; Professional Patent Solutions

(57) ABSTRACT

Disclosed is a method and system for software remediation. A data storage device may store one or more sets of related software application image blocks, wherein a set of image blocks is associated with a software application and is generated by parsing components of the software application, such that said image blocks include at least a partial image of a file associated with the application, and at least one of: (1) registry keys and values associated with the application, and (2) operating system objects associated with the application. A communication module may exchange characterization data relating to image blocks with a client computer. A customized check module may be provided for providing the client computer with a set of one or more customized checks, and designate an image block as anomalous based on the result of a check. A remediation module may be provided for repairing the anomalous image block.

10 Claims, 9 Drawing Sheets

(56) References Cited

U.S. PATENT DOCUMENTS

| | | | |
|---|---|---|---|
| 2003/0093707 A1* | 5/2003 | Paek .................................. | 714/2 |
| 2005/0010916 A1* | 1/2005 | Hagen et al. .................. | 717/170 |
| 2005/0102669 A1* | 5/2005 | Marney et al. ................ | 717/174 |
| 2005/0240815 A1* | 10/2005 | Purkeypile et al. ............. | 714/15 |
| 2007/0022328 A1* | 1/2007 | Tarra et al. .................... | 714/100 |
| 2007/0168708 A1* | 7/2007 | McCuller .......................... | 714/6 |
| 2008/0244747 A1* | 10/2008 | Gleichauf et al. .............. | 726/25 |
| 2010/0005339 A1* | 1/2010 | Hooks ............................. | 714/25 |

* cited by examiner

SYSTEM AND METHOD FOR SOFTWARE APPLICATION REMEDIATION

FIELD OF THE INVENTION

The present invention relates generally to the field of computing. More specifically, the present invention relates to a method and system for software application or operating system remediation.

BACKGROUND

To repair a malfunctioning computer is a money and time consuming operation. The average user is incapable of repairing his/hers own computer. Therefore, Users are dependent on costly, non immediate, professional tech-support. On the other hand, techs have no tools to make a pc and all of its installed applications work, and the repair process is labor-intensive.

Software corruption, i.e. corruption of software applications and operating system objects, is a primary cause for computer malfunction. Computers usually malfunction because of missing, corrupted or redundant software elements or components, damage caused by malicious software, incompatibility, and user's actions. Software applications such a MS Word or Outlook are comprised of multiple components (e.g. .dll files or software objects), each of which may be subject to corruption or deletion. The corruption, deletion or misconfiguration of any application component may cause anomalous behavior.

The majority of the users are incapable of fixing their computers by themselves; the average user knows at most how to browse the Internet. A user has no simple and easy way to know that he has a wrong version of his mouse drivers which causes a mouse not to be recognized, or to know why windows explorer is constantly crashing, or why the media player does not play movies, or why a trial expired version of Nero viewer prevents the viewing of JPG images. Average users are lacking the knowledge to repair their own machines and need professional help. Thus, even the simplest problem that can be resolved in a mouse click is a major problem for the average user.

Repairing the machine involves spending money, time, down-time, and privacy issues. Even if there are no guarantees that all of the installed software and files will operate normally after the repair. The repair costs money. The user cannot work on the malfunctioned computer during this period which may last for some time. Discrete information and passwords that are on the machine are out of his home and become a breech of user's privacy. The technician may decide that it is faster and cheaper for him to reformat the machine without backing up and reinstalling everything again. In fixing a computer there are more issues that just making the machine work. Repairing the computer is becoming not so simple task; especially when computers are a constant part of our daily life.

Making the computer work means making all of its components work. A component is software or its part that can be fixed, reinstalled or removed. Formatting the hard drive and reinstalling everything back is a way to repair computers. Removing a faulty program may solve a problem. Updating or patching may yield good results. Fixing a component will resolve the problem without affecting on other components. Although there are various ways to make the component work, the nature of the solution is the same—in order to make the computer work its faulty components must be repaired.

Fixing anomalies within component requires specialty in that specific component. Each component has its own set of data, configuration, files, and logic. Knowing how to fix MS windows XP does not guarantee that one will know how to fix RAR's archiving software crashing issues. Each component is a world of its own. This usually is why components are seldom fixed and often reinstalled. Consequently, fixing components is not simple and not common.

It would be useful, therefore to have a method for repairing of computer operating systems and software components by eliminating anomalies.

SUMMARY OF THE INVENTION

The present invention is a method and system for repairing or remediation of one or more software applications, including an operating system, running on a computer, by detecting anomalies in one or more components associated with the software application. According to some embodiments of the present invention, a faulty software component may be repaired or replaced by comparing its state to the state of a corresponding reference component and modifying, replacing, or removing the faulty component based on the results of the comparison.

According to some embodiments of the present invention, a software remediation system server may store sets of related software application image blocks in a software image repository. According to some embodiments of the present invention, the software image repository may be located on the remediation server. According to alternative embodiments of the present invention, the software image repository may be distributed across one more servers and/or end-users' computers functionally associated with the remediation server. According to other embodiments of the present invention, the repository may be located on one or more mass storage devices (e.g. removable HD, USB storage, etc.) functionally associated with the client.

According to some embodiments of the present invention, reference image blocks associated a given application may be generated by parsing the application's installation files. According to alternative embodiments of the present invention, a reference image block may be generated by monitoring an installation process of the given application. According to other embodiments of the present invention, an image block may be generated by collecting data from a number of client computers, and identifying the similarities and differences between them. Any method or technology for generating reference image blocks known today or to be devised in the future may be applicable to the present invention.

According to some embodiments of the present invention, an application image block may be defined as: (1) a partial or full image of a file associated with the application, (2) an image of one or more files associated with the application, (3) registry keys and values associated with the application, and (4) entries in configuration files and/or any other data associated (i.e. operating system objects) with the application. It should be clear to one of ordinary skill in the art that an Image block of a given software application may be defined and/or composed of any data which constitutes or is otherwise associated with the software application. According to further embodiments of the present invention, an image block may be normalized, i.e. with installation-specific information (e.g. installation path, environment variables, user names, and other such settings) replaced with generic variables. According to further embodiments of the present invention, relative configuration between a normalized reference image block and the installed application image block may be taken into account and the corresponding object structures and may be mapped from the reference object structure to the installed object structure. According to alternative embodiments of the present invention, an image block may be stored as absolute data, containing a true replicate image of an installed component.

According to some embodiments of the present invention, a remediation server and a client computer may communicate via a distributed data network (e.g. Internet). Image block characterization data relating to applications installed on the client may be exchanged between the client and the remediation server. According to some embodiments of the present invention, an application identification module on the client may identify installed applications or components associated with installed applications, and may transmit through a communication module the data associated with identified applications. The application identification module may transmit only a list of identified applications, or, according to further embodiments of the present invention, may derive image block characterization data for identified applications or application components and may transmit the characterization data to the remediation server.

According to some embodiments of the present invention, the remediation server may send to the client image block characterization data associated with applications installed on the client. The remediation server may send the image block characterization data in response to a list of applications or application components sent by the client, or it may send characterization data of all applications/components image blocks stored in the repository. According to embodiments of the present invention where the server sends characterization data of all application/component image blocks stored in the repository, the client may respond by sending back a list of image blocks required for software remediation/repair.

According to some embodiments of the present invention, the remediation server may send to the client customized check procedures which may be designed to perform complex validation and/or consistency checks on data content of components. According to some embodiments of the present invention, a customized check procedure may be one or more of: checking that a field in a configuration file is within its valid range, checking that a specified path value really exists on the client, checking that a specified resource a value points to (e.g. an IP port) is really useable, checking that an application data file is consistent, and/or any other check that may require application-specific knowledge.

According to some embodiments of the present invention, the characterization data may consist of: (1) checksum (such as MD5), (2) cryptographic signature, (3) file size and modification time, and/or any other file and data characterization parameter known today or to be devised in the future.

According to some embodiments of the present invention, an image block comparison module, operating either on the client or on the remediation server, may compare characterization data of reference image blocks with characterization data of image blocks associated with applications installed on the client. The comparison module may designate or flag an image block of an application stored on the client as being anomalous if there is a mismatch between that image block's characterization data the characterization data of a corresponding reference image block. According to some embodiments of the present invention, the comparison module may compare a substantial portion of the data bits of the client image block its corresponding reference image block.

It should be understood by one of ordinary skill in the art that the application comparison module may take into account normalization factors, as described above, during the process of comparing a normalized reference image block and an image block on the client. The comparison module may take into account relative configuration deltas between a normalized reference image block and the installed application image block, and may map corresponding object structures from the installed object structure to the reference object structure.

It should be understood by one of ordinary skill in the art that comparison of reference image blocks and installed image block may be performed according to numerous methodologies and using various techniques. Any method, code or technology for comparing reference components or structures to installed components or structures, known today or to be devised in the future, may be applicable to the present invention.

According to some embodiments of the present invention, upon determining which applications and/or related components have anomalous image blocks (i.e. need repair), the server may send the application image blocks to the client. The transmission of image blocks and needing repair/replacement/removal may be performed in response to a request from the client. According to some embodiments, a user of the client computer may respond to a report of detected anomalous image blocks, which response may be the basis of the image block request to the remediation server. The report may be based on the results of the comparison and customized checks performed by the comparison module, either running on the client or on the remediation server. The user may select which image blocks to repair/replace/removal, and thus an image block request to the server may be generated and transmitted.

According to some embodiments of the present invention, an application repair module running on the computer may use reference image blocks and customized repair procedures received from the remediation server to repair/replace/remove corresponding image blocks on the client, which corresponding image blocks have been designated as anomalous. According to further embodiments of the present invention, if a reference image block received from the remediation server is normalized, the application repair module on the client computer may replace the normalized image's generic variables with values specific to the corresponding image block installed on the client computer. The repair module may take into account relative configuration deltas between a normalized reference image block and the installed application image block and may map corresponding object structures from the reference object structure to the installed object structure.

According to alternative embodiments of the present invention, if an image block sent by the server was absolute, the client computer may identify which settings are general and which are installation-specific, and may modify them accordingly.

According to some embodiments of the present invention, the repair module may remove image blocks associate with application components and operating system components or structures which have been found to be redundant or conflicting by the comparison module.

According to some embodiments of the present invention, the remediation server may send to the client customized repair procedures which may be designed to perform complex repair operations on data content of components. According to some embodiments of the present invention, a customized repair procedure may be one or more of: changing a field in a configuration file to one a valid value, creating a non-existent path specified, changing an unusable resource value specified (e.g. an IP port) to a usable one, repairing an inconsistent application data file, and/or any other action that requires application-specific knowledge.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
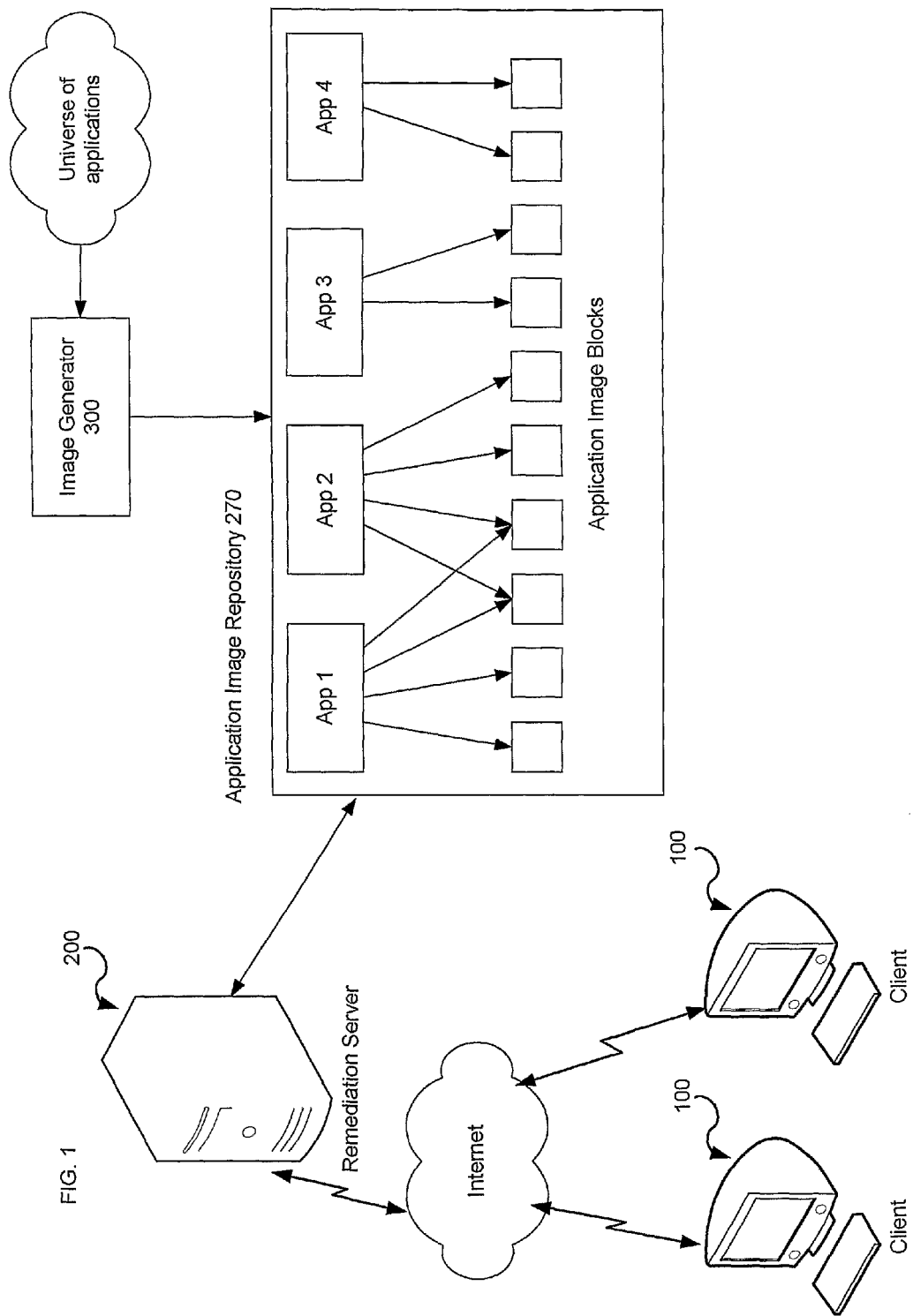
FIG. 1 is a block diagram illustrating the main components of an exemplary software remediation system in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is a method and system for repairing or remediation of one or more software applications, including an operating system, running on a computer, by detecting anomalies in one or more components associated with the software application. According to some embodiments of the present invention, a faulty software component may be repaired or replaced by comparing its state to the state of a corresponding reference component and modifying, replacing, or removing the faulty component based on the results of the comparison.

According to some embodiments of the present invention, a software remediation system server may store sets of related software application image blocks in a software image repository. According to some embodiments of the present invention, the software image repository may be located on the remediation server. According to alternative embodiments of the present invention, the software image repository may be distributed across one more servers and/or end-users' computers functionally associated with the remediation server. According to other embodiments of the present invention, the repository may be located on one or more mass storage devices (e.g. removable HD, USB storage, etc.) functionally associated with the client.

According to some embodiments of the present invention, reference image blocks associated a given application may be generated by parsing the application's installation files. According to alternative embodiments of the present invention, a reference image block may be generated by monitoring an installation process of the given application. According to other embodiments of the present invention, an image block may be generated by collecting data from a number of client computers, and identifying the similarities and differences between them. Any method or technology for generating reference image blocks known today or to be devised in the future may be applicable to the present invention.

According to some embodiments of the present invention, an application image block may be defined as: (1) a partial or full image of a file associated with the application, (2) an image of one or more files associated with the application, (3) registry keys and values associated with the application, and (4) entries in configuration files and/or any other data associated (i.e. operating system objects) with the application. It should be clear to one of ordinary skill in the art that an Image block of a given software application may be defined and/or composed of any data which constitutes or is otherwise associated with the software application. According to further embodiments of the present invention, an image block may be normalized, i.e. with installation-specific information (e.g. installation path, environment variables, user names, and other such settings) replaced with generic variables. According to further embodiments of the present invention, relative configuration between a normalized reference image block and the installed application image block may be taken into account and the corresponding object structures and may be mapped from the reference object structure to the installed object structure. According to alternative embodiments of the present invention, an image block may be stored as absolute data, containing a true replicate image of an installed component.

According to some embodiments of the present invention, a remediation server and a client computer may communicate via a distributed data network (e.g. Internet). Image block characterization data relating to applications installed on the client may be exchanged between the client and the remediation server. According to some embodiments of the present invention, an application identification module on the client may identify installed applications or components associated with installed applications, and may transmit through a communication module 130 the data associated with identified applications. The application identification module may transmit only a list of identified applications or, according to further embodiments of the present invention may derive image block characterization data for identified applications or application components and may transmit the characterization data to the remediation server.

According to some embodiments of the present invention, the remediation server may send to the client image block characterization data associated with applications installed on the client. The remediation server may send the image block characterization data in response to a list of applications or application components sent by the client, or it may send characterization data of all applications/components image blocks stored in the repository. According to embodiments of the present invention where the server sends characterization data of all application/component image blocks stored in the repository, the client may respond by sending back a list of image blocks required for software remediation/repair.

According to some embodiments of the present invention, the remediation server may send to the client customized check procedures which may be designed to perform complex validation and/or consistency checks on data content of components. According to some embodiments of the present invention, a customized check procedure may be one or more of: checking that a field in a configuration file is within its valid range, checking that a specified path value really exists on the client, checking that a specified resource a value points to (e.g. an IP port) is really useable, checking that an application data file is consistent, and/or any other check that may require application-specific knowledge.

According to some embodiments of the present invention, the characterization data may consist of: (1) checksum (such as MD5), (2) cryptographic signature, (3) file size and modification time, and/or any other file and data characterization parameter known today or to be devised in the future.

According to some embodiments of the present invention, an image block comparison module, operating either on the client or on the remediation server, may compare characterization data of reference image blocks with characterization data of image blocks associated with applications installed on the client. The comparison module may designate or flag an image block of an application stored on the client as being anomalous if there is a mismatch between that image block's characterization data the characterization data of a corresponding reference image block. According to some embodiments of the present invention, the comparison module may compare a substantial portion of the data bits of the client image block its corresponding reference image block.

It should be understood by one of ordinary skill in the art that the application comparison module may take into account normalization factors, as described above, during the process of comparing a normalized reference image block and an image block on the client. The comparison module may take into account relative configuration deltas between a normalized reference image block and the installed application image block, and may map corresponding object structures from the installed object structure to the reference object structure.

It should be understood by one of ordinary skill in the art that comparison of reference image blocks and installed image block may be performed according to numerous methodologies and using various techniques. Any method, code or technology for comparing reference components or structures to installed components or structures, known today or to be devised in the future, may be applicable to the present invention.

According to some embodiments of the present invention, upon determining which applications and/or related components have anomalous image blocks (i.e. need repair), the server may send the application image blocks to the client. The transmission of image blocks and needing repair/replacement/removal may be performed in response to a request from the client. According to some embodiments, a user of the client computer may respond to a report of detected anomalous image blocks, which response may be the basis of the image block request to the remediation server. The report may be based on the results of the comparison and customized checks performed by the comparison module, either running on the client or on the remediation server. The user may select which image blocks to repair/replace/removal, and thus an image block request to the server may be generated and transmitted.

According to some embodiments of the present invention, an application repair module running on the computer may use reference image blocks and customized repair procedures received from the remediation server to repair/replace/remove corresponding image blocks on the client, which corresponding image blocks have been designated as anomalous. According to further embodiments of the present invention, if a reference image block received from the remediation server is normalized, the application repair module on the client computer may replace the normalized image's generic variables with values specific to the corresponding image block installed on the client computer. The repair module may take into account relative configuration deltas between a normalized reference image block and the installed application image block and may map corresponding object structures from the reference object structure to the installed object structure.

According to alternative embodiments of the present invention, if an image block sent by the server was absolute, the client computer may identify which settings are general and which are installation-specific, and may modify them accordingly.

According to some embodiments of the present invention, the repair module may remove image blocks associate with application components and operating system components or structures which have been found to be redundant or conflicting by the comparison module.

According to some embodiments of the present invention, the remediation server may send to the client customized repair procedures which may be designed to perform complex repair operations on data content of components. According to some embodiments of the present invention, a customized repair procedure may be one or more of: changing a field in a configuration file to one a valid value, creating a non-existent path specified, changing an unusable resource value specified (e.g. an IP port) to a usable one, repairing an inconsistent application data file, and/or any other action that requires application-specific knowledge.

Reference is now made to FIG. 1, which is a block diagram illustrating the main components of an exemplary software remediation system in accordance with some embodiments of the present invention. According to some embodiments of the present invention, a remote server 200 may be functionally associated with an application image repository 270, which is created and maintained by the image generator 300. A client computer 100 may connect over a network to a server, and exchange information related to the application components installed on it, and to the application image blocks stored in the repository 270.

Figure 2A:
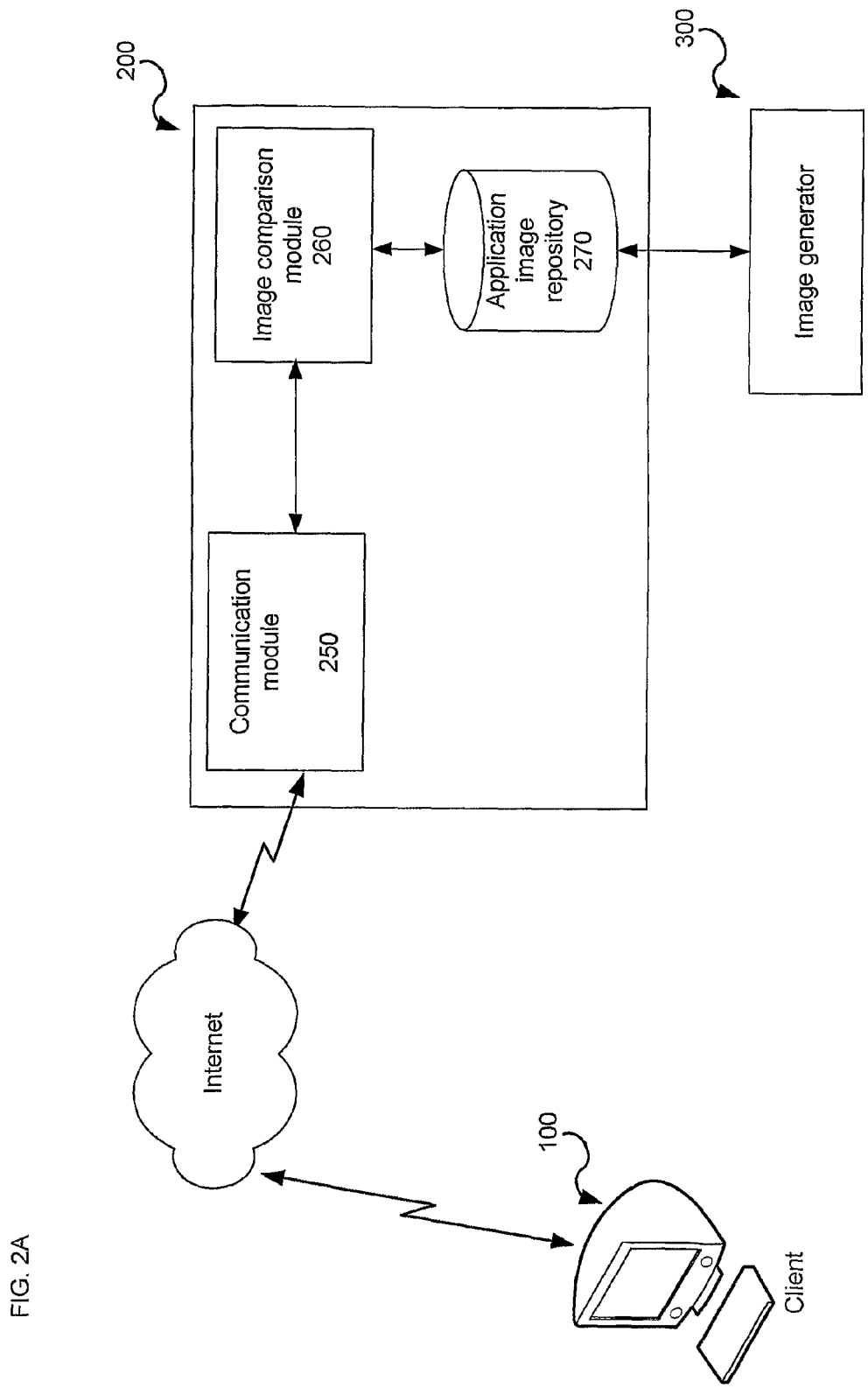
FIG. 2A is a block diagram illustrating the functional building blocks of a software remediation server including an image comparison module in accordance with some embodiments of the present invention.
Figure 3A:
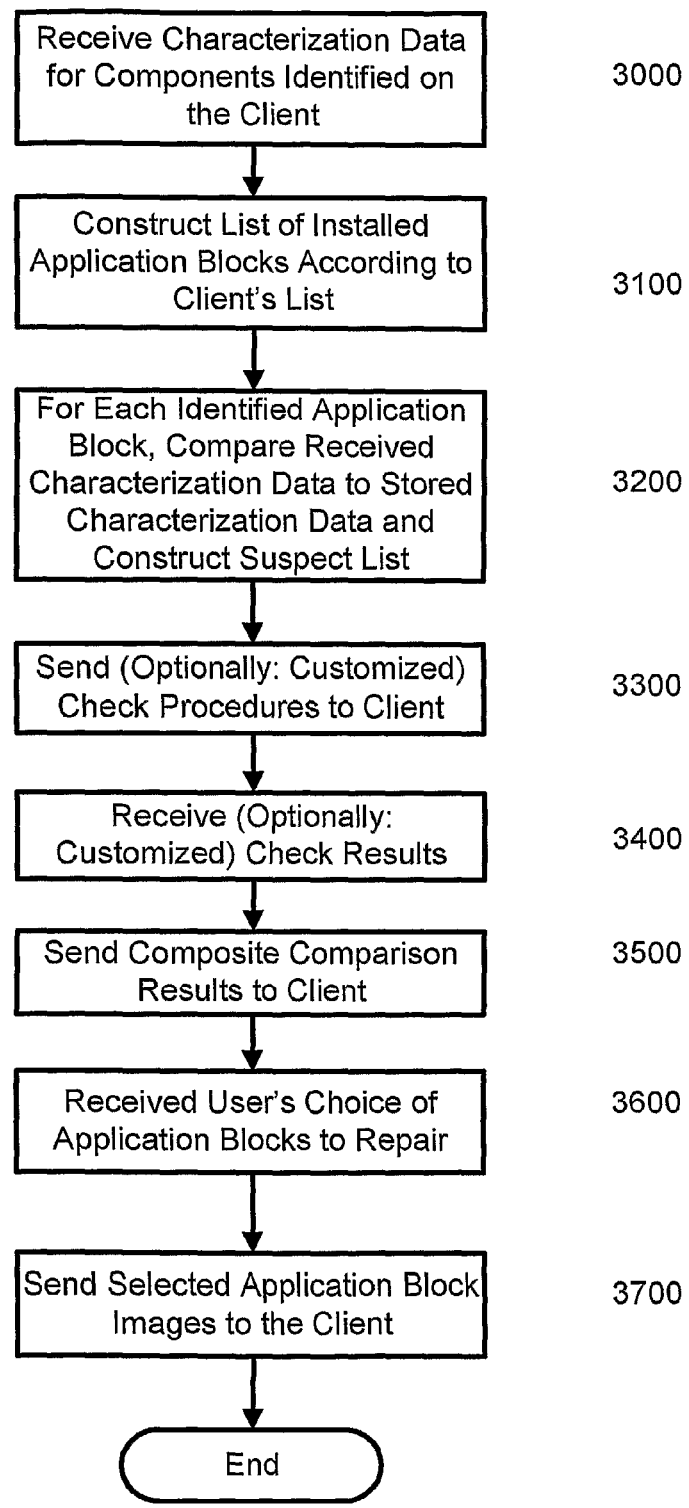
FIG. 3A is a flowchart illustrating an exemplary method by which a software remediation server repairs a client computer from the viewpoint of a remediation server in accordance with some embodiments of the present invention.

Reference is now made to FIG. 2A, which is a block diagram illustrating the functional building blocks of a software remediation server including an image comparison module in accordance with some embodiments of the present invention, and to FIG. 3A, which is a flowchart illustrating an exemplary method by which a software remediation server repairs a client computer from the viewpoint of a remediation server in accordance with some embodiments of the present invention. According to some embodiments of the present invention, a client computer 100 connects to the server 200 via the communication module 250, and sends it characterization data for components it has identified (step 3000). The server 200 may then construct a list of all the application image blocks associated with the components the client has identified (step 3100). The comparison module 260 may then compare the received characterization data with characterization data of components stored in the repository 270 and construct a list of suspected anomalies (step 3200). The server 200 may then send the client 100 a set of customized checks, which may be specific for some of the identified application blocks (step 3300). After receiving the customized check results (step 3400), the server may send the comprehensive results to the client (step 3500). The client computer 100 may then present the user with a list of anomalous components which can be repaired, and forward their choice to the server 200 (step 3600). Upon receiving the user's choice, the server 200 may send the full application image blocks and customized repair procedures to the client for it to restore (step 3700).

Figure 2B:
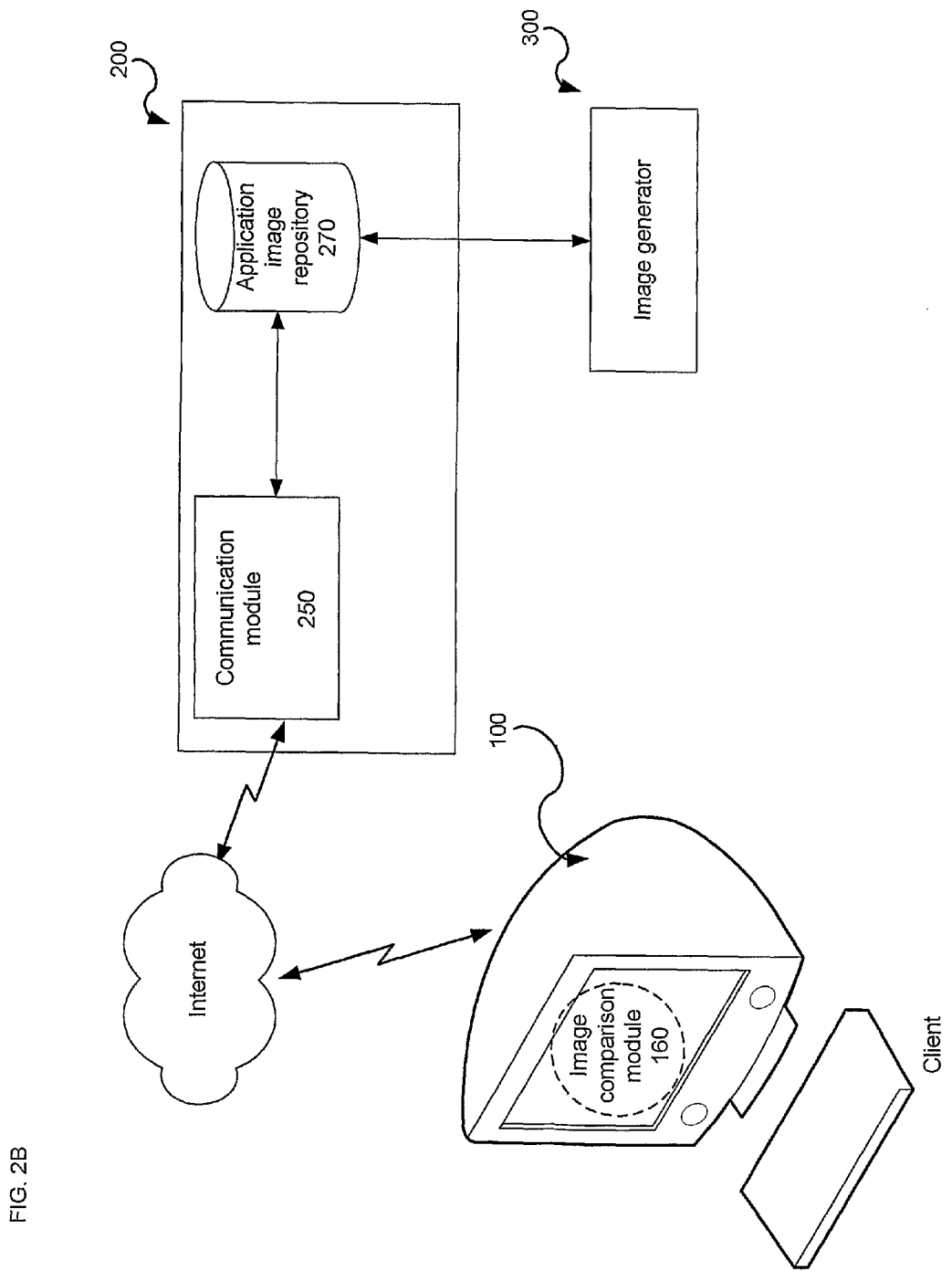
FIG. 2B is a block diagram illustrating the functional building blocks of a software remediation server in accordance with some embodiments of the present invention.
Figure 3B:
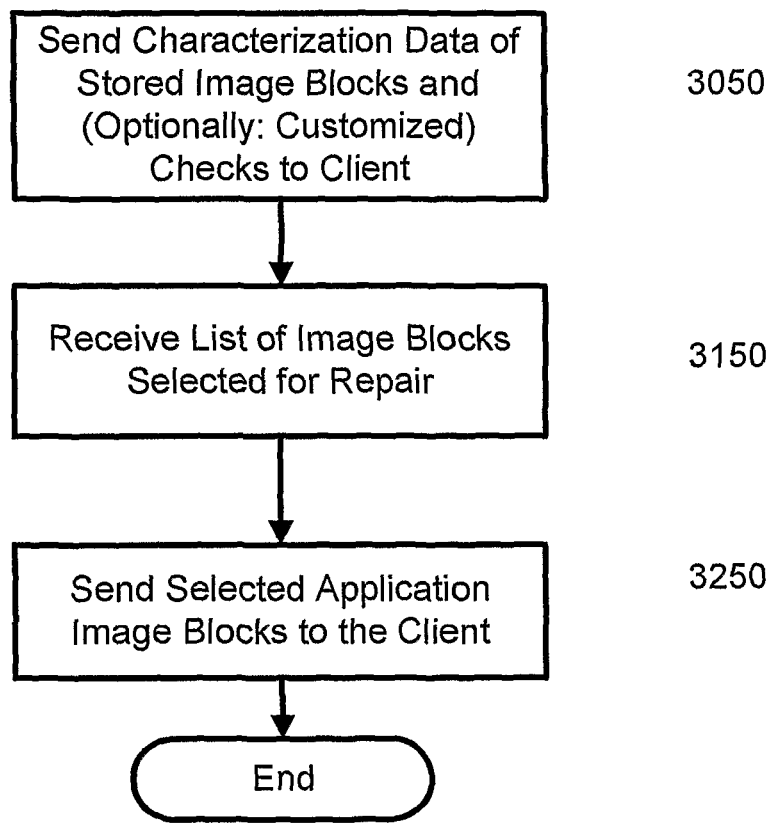
FIG. 3B is a flowchart illustrating an exemplary method by which a software remediation server repairs a client computer from the viewpoint of a remediation server in accordance with some embodiments of the present invention.

Reference is now made to FIG. 2B, which is a block diagram illustrating the functional building blocks of a software remediation server in accordance with some embodiments of the present invention, and to FIG. 3B, which is a flowchart illustrating an exemplary method by which a software remediation server repairs a client computer from the viewpoint of a remediation server in accordance with some embodiments of the present invention. According to some embodiments of the present invention, a remediation server 200 accepts a connection from a client computer 100 via the communication module 250, and sends it characterization data of all components/image blocks and customized checks stored in the repository 270 (step 3050). The client computer 100 then compares its application components/image blocks with the reference image blocks on the server 200, and sends to the server 200 a list of required image blocks (step 3150). The server 200 then sends the requested image blocks and customized repair procedures to the client 100 via the communication module 250 (step 3250).

Figure 4A:
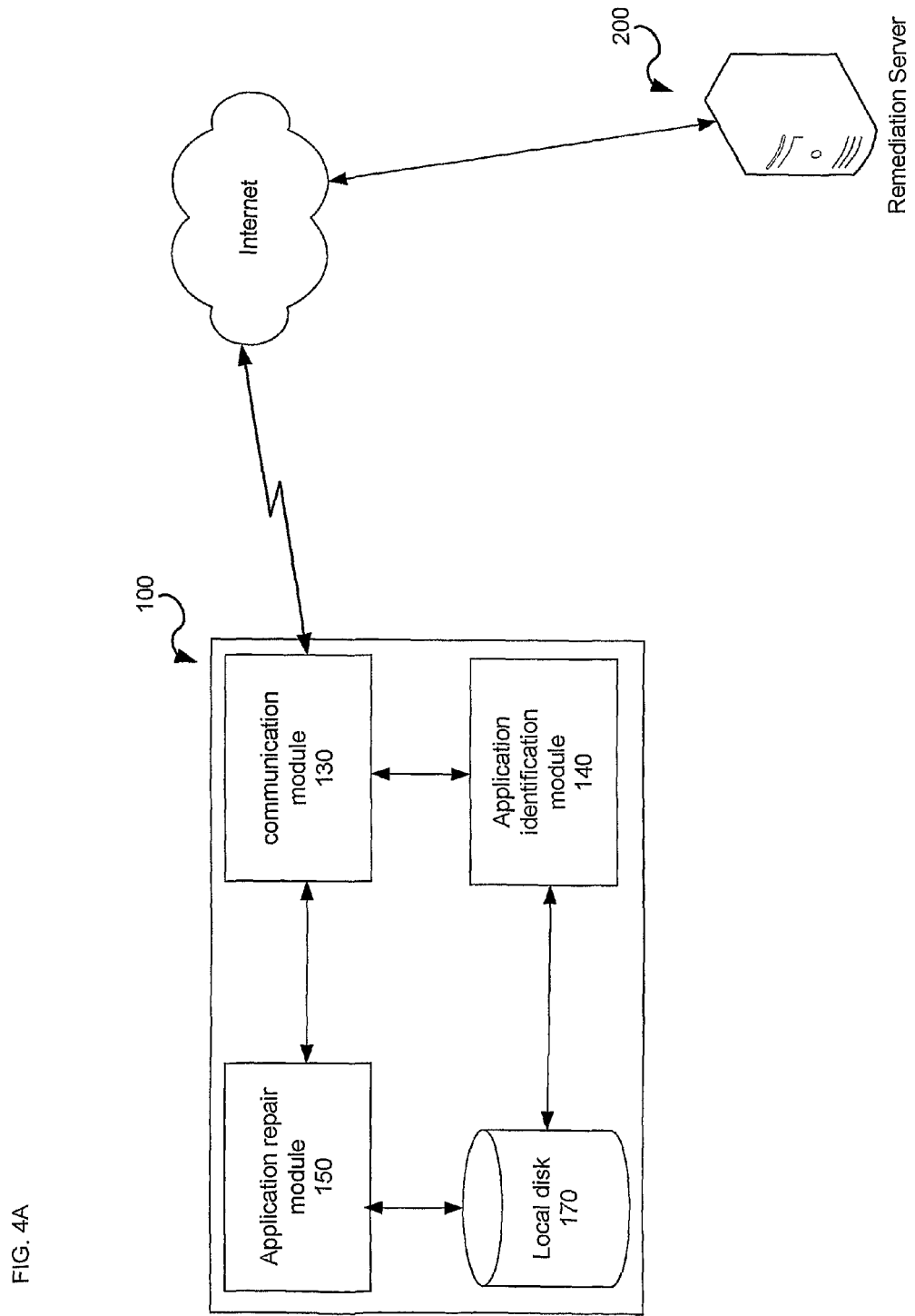
FIG. 4A is a block diagram illustrating the functional building blocks of a software remediation client system in accordance with some embodiments of the present invention.
Figure 5A:
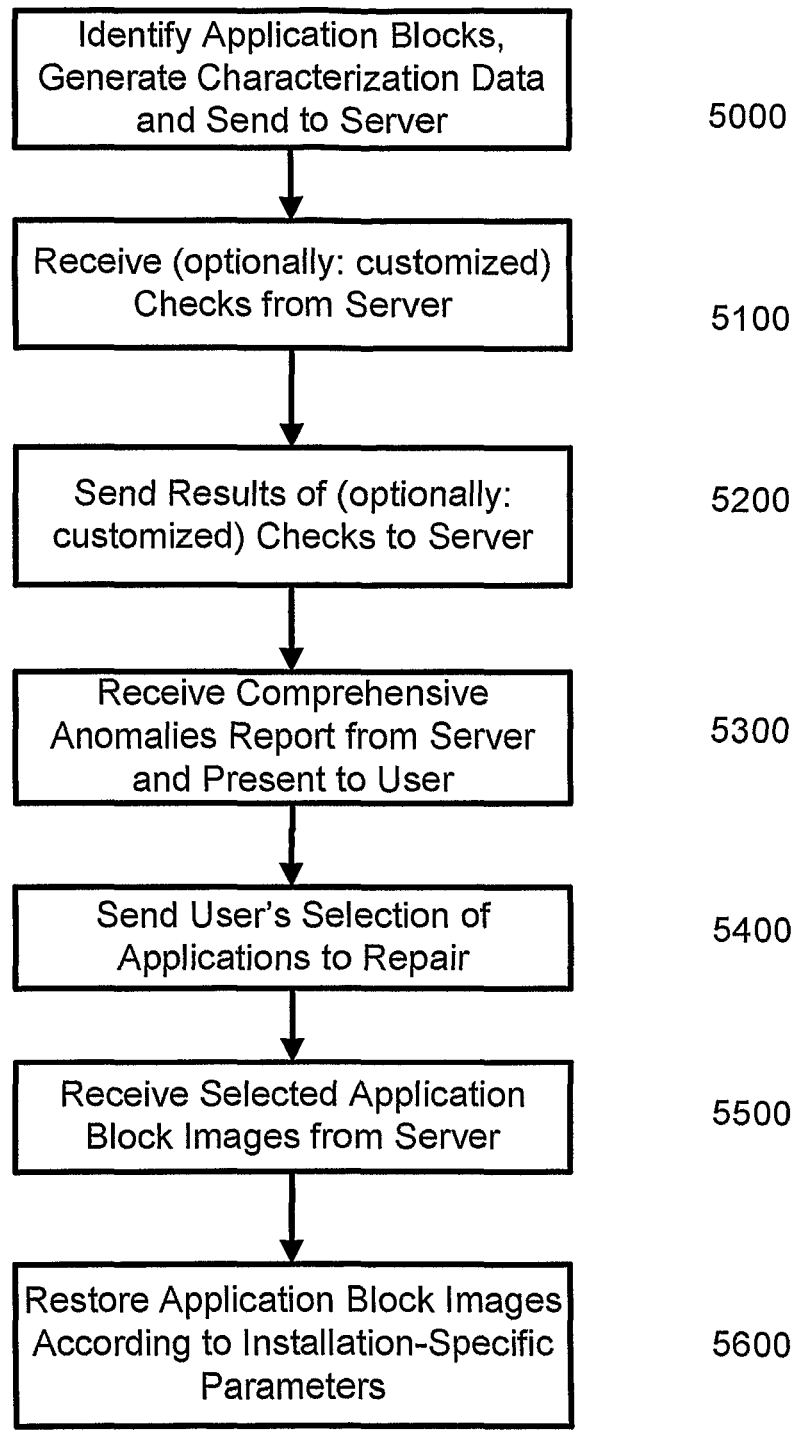
FIG. 5A is a flowchart illustrating an exemplary method by which a software remediation server repairs a client computer from the viewpoint of a client in accordance with some embodiments of the present invention.

Reference is now made to FIG. 4A, which is a block diagram illustrating the functional building blocks of a software remediation client system in accordance with some embodiments of the present invention, and to FIG. 5A, which is a flowchart illustrating an exemplary method by which a software remediation server repairs a client computer from the viewpoint of a client computer in accordance with some embodiments of the present invention. According to some embodiments of the present invention, a client computer 100 connects to the server 200 and sends it a characterization data of components identified by the application identification module 140 (step 5000). The server 200 may then send a set of customized check procedures, which may be specific for some of the identified application blocks (step 5100). The client 200 may then perform the customized checks, and send the results to the server (step 5200). The server 200 may then combine the results of the customized checks and the characterization data comparisons it had performed, and send a comprehensive list of anomalies to the client 100, which may present it to the user as a report, containing the identified anomalies that can be repaired (step 5300). The client may then accept and forward the user's choice of which components/application blocks to repair to the server (step 5400). Upon receiving the user's choice, the server 200 may send the full application image blocks and customized repair procedures to the client (step 5500), where they are restored by the application repair module 150, after converting normalized data to absolute data (step 5600).

Figure 4B:
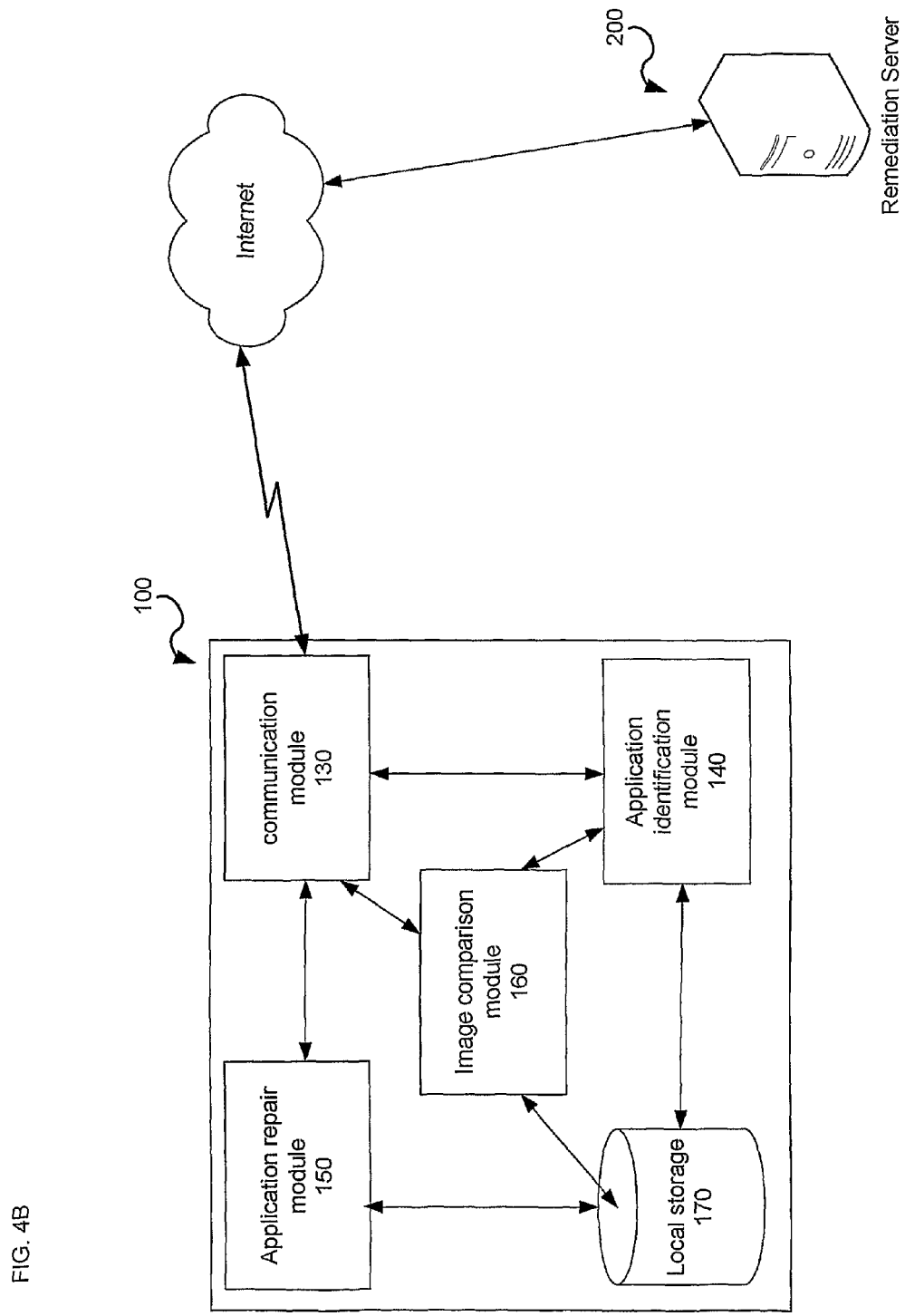
FIG. 4B is a block diagram illustrating the functional building blocks of a software remediation client system including an image comparison module in accordance with some embodiments of the present invention.
Figure 5B:
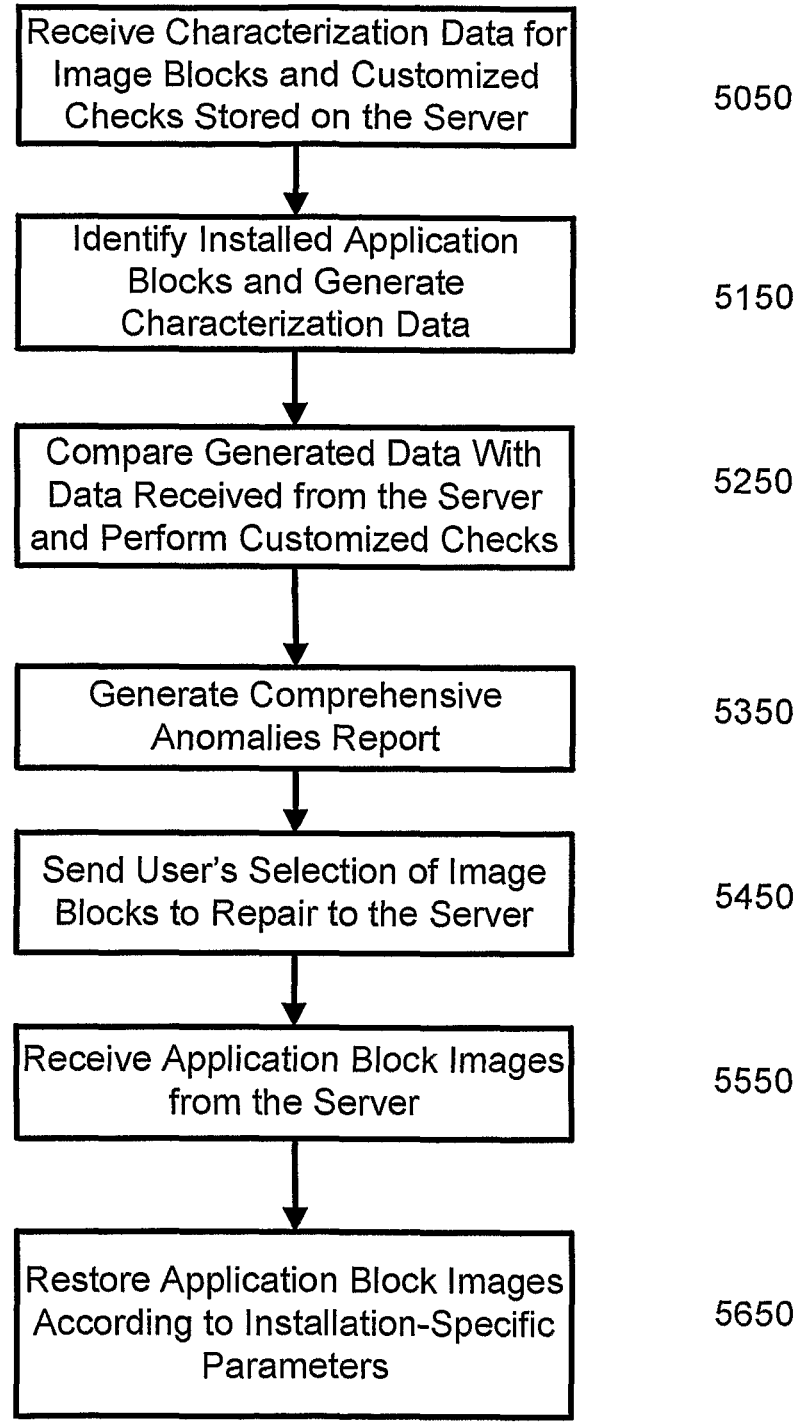
FIG. 5B is a flowchart illustrating an exemplary method by which a software remediation server repairs a client computer from the viewpoint of a client in accordance with some embodiments of the present invention.

Reference is now made to FIG. 4B, which is a block diagram illustrating the functional building blocks of a software remediation client system including an image comparison module in accordance with some embodiments of the present invention, and to FIG. 5B, which is a flowchart illustrating an exemplary method by which a software remediation server repairs a client computer from the viewpoint of a client computer in accordance with some embodiments of the present invention. According to some embodiments of the present invention, a client computer 100 connects to the server 200 and receives characterization data for all components/image blocks known to the server (step 5050). The application identification module 140 identifies components/image blocks related to installed application found on the local storage 170, and generates characterization data for them (step 5150). The image comparison module 160 may then compare the characterization data generated for the identified components/image blocks with the corresponding characterization data of the reference image blocks received from the remediation server 200 (step 5250). The comparison module 160 may then generate a comprehensive anomalies report based the comparison and present it to the user (step 5350). After the user has chosen which components/image blocks to repair/restore, the client 200 sends a list of requested image blocks to the server 200 (step 5450). The server 200 then sends the requested image blocks and customized repair procedures to the client (step 5550), where they are restored by the application repair module 150 (step 5650).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A software remediation system comprising:
    a data storage device storing one or more sets of related software application image blocks, wherein a set of image blocks is associated with a software application and is generated by parsing components of the software application and related data objects, such that said image blocks include at least a partial image of a file associated with the application, and at least one of: (1) registry keys and values associated with the application, and (2) operating system objects associated with the application;
    a communication module adapted to exchange data relating to image blocks with a client computer;
    an image block comparison module adapted to: (1) compare image blocks from a client computer with reference image blocks, and (2) designate a given installed application image block on the client computer as suspected to be anomalous based on a mismatch between the given image block and a corresponding reference image block;
    a customized check module adapted to: (1) provide the client computer with a set of one or more customized checks, including at least one check specific to the given image block designated as suspected to be anomalous, and (2) designate the given image block as anomalous based on the results of the set of one or more checks; and
    a remediation module adapted to: (1) provide the client computer with a repair procedure and the corresponding image block of the one or more sets of image blocks to replace the given image block designated as anomalous, and (2) selectively replace the given image block with the corresponding image block;
    wherein an anomalous image block is an image block containing data inconsistent with data contained in a corresponding reference image block.

2. The system according to claim 1, wherein said comparison module is further adapted to generate a list of image blocks designated as suspected to be anomalous.

3. The system according to claim 2, wherein the generated list indicates which image blocks are mismatched and said system is further adapted to transmit at least a portion of the generated list to the client computer.

4. The system according to claim 1, wherein said communication module is adapted to transmit a reference image block to the client computer in response to a signal indicating a corresponding image block on the client computer is in a corrupt state.

5. The system according to claim 1, further comprising an image generator module adapted to parse an installed software application into one or more image blocks.

6. A method of remediating software on a computer comprising:
    storing on a data storage device one or more sets of related software application image blocks, wherein a set of image blocks is associated with a software application and is generated by parsing components of the software application and related data objects, such that said image blocks include at least a partial image of a file associated with the application, and at least one of: (1) registry keys and values associated with the application, and (2) operating system objects associated with the application;
    exchanging with a client computer data relating to image blocks;
    comparing image blocks from the client computer with reference image blocks;
    designating a given installed application image block on the client computer as suspected to be anomalous based on a mismatch between the given image block and a corresponding reference image block;
    providing the client computer with a set of one or more customized checks, including at least one check specific to the given image block designated as suspected to be anomalous;
    designating the given image block as anomalous based on the results of the set of one or more checks;
    providing the client computer with a repair procedure and the corresponding image block of the one or more sets of image blocks to replace the given image block designated as anomalous; and
    selectively replacing the given image block with the corresponding image block;
    wherein an anomalous image block is an image block containing data inconsistent with data contained in a corresponding reference image block.

7. The method according to claim 6, further comprising generating a list of image blocks designated as suspected to be anomalous.

8. The method according to claim 7, wherein the generated list indicates which image blocks are mismatched.

9. The method according to claim 7, further comprising transmitting at least a portion of the list to the client computer.

10. The method according to claim 6, further comprising transmitting a reference image block to the client in response to a signal indicating a corresponding image block on the client computer is in a corrupt state.

* * * * *